United States Patent
Rousseau

(10) Patent No.: US 9,146,103 B2
(45) Date of Patent: Sep. 29, 2015

(54) APPARATUS AND OPTICAL METHOD OF RANGING AND OF HIGH BIT-RATE COMMUNICATION

(75) Inventor: Pascal Rousseau, Viroflay (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 13/992,675

(22) PCT Filed: Nov. 18, 2011

(86) PCT No.: PCT/EP2011/070428
§ 371 (c)(1),
(2), (4) Date: Jul. 1, 2013

(87) PCT Pub. No.: WO2012/076316
PCT Pub. Date: Jun. 14, 2012

(65) Prior Publication Data
US 2013/0286376 A1  Oct. 31, 2013

(30) Foreign Application Priority Data
Dec. 10, 2010  (FR) ..................... 10 04817

(51) Int. Cl.
*G01C 3/08* (2006.01)
*G01S 7/483* (2006.01)
*G01S 17/74* (2006.01)
*H04B 10/112* (2013.01)

(52) U.S. Cl.
CPC . *G01C 3/08* (2013.01); *G01S 7/483* (2013.01); *G01S 17/74* (2013.01); *H04B 10/112* (2013.01)

(58) Field of Classification Search
CPC ........ G01C 3/08; G01C 15/002; G01S 17/89; G01S 7/4817; G01S 17/42

USPC ........... 356/3.01, 3.09, 4.01, 4.07, 5.01, 5.09, 356/9, 625
See application file for complete search history.

(56) References Cited

U.S. PATENT DOCUMENTS

| 4,350,993 A * | 9/1982 | Wieder ............................. 315/3 |
| 6,219,596 B1 | 4/2001 | Fukae et al. |
| 6,229,939 B1 * | 5/2001 | Komine .......................... 385/29 |

(Continued)

FOREIGN PATENT DOCUMENTS

| FR | 2604796 A1 | 4/1988 |
| FR | 2681143 A1 | 3/1993 |

(Continued)

*Primary Examiner* — Luke Ratcliffe
*Assistant Examiner* — Samantha K Abraham
(74) *Attorney, Agent, or Firm* — Baker & Hostetler LLP

(57) ABSTRACT

An optical apparatus for ranging and communication in free space comprises a rangefinder comprising a device for transmitting an optical signal to a target and a device for receiving the signals backscattered by the target. A system for optical communication in free space comprises a device for transmitting an optical signal to a remote optical receiving device. The transmitting device of the rangefinder and transmitting device of the communication system is a transmitting device common to the rangefinder and communication system and transmitting pulses of peak power greater than 50 W and shape factor less than 0.01 or a modulated continuous signal of peak power less than 10 W and shape factor equal to approximately 0.5 and the apparatus comprises a supervisor controlling the common transmitting device according to two modes, the pulse mode to perform the ranging function, or the modulated continuous mode to perform the optical communication function.

13 Claims, 4 Drawing Sheets

(56) References Cited

U.S. PATENT DOCUMENTS

| | | | | |
|---|---|---|---|---|
| 7,872,794 | B1* | 1/2011 | Minelly et al. | 359/341.31 |
| 2006/0227286 | A1* | 10/2006 | Hong et al. | 351/159 |
| 2006/0232761 | A1* | 10/2006 | McConville et al. | 356/5.1 |
| 2008/0191924 | A1* | 8/2008 | Duff et al. | 342/14 |
| 2009/0146793 | A1* | 6/2009 | Fullerton | 340/10.4 |
| 2011/0116072 | A1 | 5/2011 | Rousseau | |

FOREIGN PATENT DOCUMENTS

| | | |
|---|---|---|
| FR | 2913269 A1 | 9/2008 |
| WO | 2005001511 A1 | 1/2005 |

* cited by examiner

APPARATUS AND OPTICAL METHOD OF RANGING AND OF HIGH BIT-RATE COMMUNICATION

CROSS-REFERENCE TO RELATED APPLICATIONS

This application is a National Stage of International patent application PCT/EP2011/070428, filed on Nov. 18, 2011, which claims priority to foreign French patent application No. FR 1004817, filed on Dec. 10, 2010, the disclosures of which are incorporated by reference in their entirety.

FIELD OF THE INVENTION

The field of the invention is that of apparatus performing the functions of optical ranging and of optical communication in free space. More specifically, it involves an apparatus of which the range of the airborne rangefinder in air-air can reach up to several tens of kilometers and performing communications in free space at very high bit rate, of the order of several gigahertz.

BACKGROUND

A rangefinder is used to measure the distance separating it from a target. An optical rangefinder uses the propagation of the light as a measurement means. It comprises a transmitter and a receiver. It transmits light toward the target and detects a fraction of this light returned by the target. The distance is obtained based on the propagation time back and forth of the light from the transmitter to the receiver. The transmission is modulated in time. The transmitted light transports this modulation to the target. The light is absorbed by the atmosphere along the outward path. It is then absorbed and reflected or backscattered by the target and then absorbed by the atmosphere on the return path; it is diluted along the return path by a factor proportional to the square of the distance. A fraction of this returned light transports the modulation to the receiver of the rangefinder. This time modulation makes it possible to identify the start of the pulse and identify its return by the receiver. The elapsed time between these two events makes it possible to calculate the distance between the rangefinder and the target based on the speed of propagation of the light in the media that are passed through.

When the distance increases, the quantity of light detected decreases rapidly. To increase the ranging distance despite these atmospheric losses, the following ways are possible:
  increasing the energy per pulse, but this increase is limited by the constraints of ocular safety and by the volume of the transmitter which increases with the energy per pulse,
  increasing the dimension of the receiving pupil but this increases the dimensions of the system,
  increasing the sensitivity of the receiver with multipulse systems using micro-lasers or fiber optic lasers. This makes it possible to use post-integration. There is increase in the mean power (energy per pulse×rate) without increasing the energy per pulse.

Currently there are three main categories of laser rangefinders.
  Rangefinders having a modulated continuous transmission
  Multipulse rangefinders
  Monopulse rangefinders The rangefinders having a modulated continuous transmission are used with cooperative targets of which the measurement time is not critical. A cooperative target is for example fitted with a back reflector, and therefore returns the light in a narrow cone in the direction of the transmitter. The system is designed so that reception is possible and during transmission.

For noncooperative targets situated at long distances of the order of several tens of km, the rangefinders usually use a single pulse of great energy limited by ocular safety in the conditions of use: the integrated exposure over 10 seconds, for a wavelength of between 1.5 and 1.8 µm, must remain below 10 000 $J/m^2$. This limit, depending on the applications, allows energies per pulse of from a few millijoules to several tens of millijoules. To achieve good distance accuracy, the pulses have a very short duration: of the order of 10 ns. Detection of the echoes is not possible during the transmission of the pulses.

For short distances (<10 km), it is possible to use laser diodes as a transmitter. The energy per pulse is very low. The performance is obtained by multiple pulses with detection with post-integration. The pulse duration of the order of 10 to 50 ns is very low compared with the period between the pulses which is of the order of 1 to 50 µs. During transmission, reception is blind. The diffusion of the transmitted light by the atmosphere over a short distance (from a few meters to a few tens of meters) blinds reception. Beyond this, detection takes place during the period between the pulses. Detection of the echo is a detection of energy.

Post-integration has certain drawbacks.
Specifically, note that:
if, for a transmitted pulse, there is for the echo a signal-to-noise ratio S/B,
therefore n transmitted pulses gives $(nS)/(n^{1/2} B)$, or $(n^{1/2} S)/B$, hence an improvement of factor $n^{1/2}$.

But in the case of post-integration, the frequency of repetition of the pulses (or rate) limits the distance that can be achieved because of the ambiguity concerning the distance. This ambiguity occurs when a detected pulse originates either from the last transmitted pulse, returned by a close target, or from a pulse transmitted earlier and returned by a distant target, without it being possible to determine between these 2 alternatives which target is measured. By accepting a larger timescale of blind reception, each pulse can be replaced by a pulse train.

An optical system for high bit-rate communication in free space also comprises a laser transmitting device for an optical signal and if the communication is two-way, it also comprises a device for receiving the optical signals transmitted by another communication system. The optical signal transmitted is a rapid succession of pulses at a period of repetition typically between 1 ns and 20 ms. The gaps between the pulses have periods similar to the pulse widths. Digital data consist of 0s and 1s. Each data bit is associated with a unitary period: a pulse during this unitary period represents a 1, no pulse during this period represents a 0. The data sequences are also usually encoded by successions of pulses and by periods between the pulses. The peak power of the communication pulses is on average double the mean power of the communication transmission. The transmission is of the modulated continuous type on two levels 0 and 1. In the rest of the description, such a succession of pulses modulated in this way is called the optical communication signal. Several examples (16 examples) of high bit-rate communication signals are shown in FIG. 3b. Over the first 10 ns, the example of the $4^{th}$ channel corresponds to the following digital sequence: 0010011010.

The transmitting device of the rangefinder and that of the communication system therefore obey contradictory constraints, and their receiving devices. Hence the use of two independent devices for performing the functions of long-range ranging and of high bit-rate optical communication in free space.

Such apparatus are then bulky and heavy. The object of the invention is to alleviate these drawbacks.

SUMMARY OF THE INVENTION

The solution according to the invention is based on the use of a single laser transmitting device that can operate in two different modes, in pulse mode, promoting energy per pulse, for ranging and in linear modulated continuous mode for high bit-rate optical communications.

More precisely, the subject of the invention is an optical apparatus for ranging and communication in free space which comprises a rangefinder comprising a device for transmitting an optical signal to a target and a device for receiving the signals backscattered by the target, and a system for optical communication in free space comprising a device for transmitting an optical signal to a remote optical receiving device. It is mainly characterized in that the transmitting device of the rangefinder and the transmitting device of the communication system is a transmitting device common to the rangefinder and to the communication system and capable of transmitting pulses of which the peak power is greater than 50 W and the shape factor is less than 0.01 or a modulated continuous signal of which the peak power is less than 10 W and the shape factor is equal to approximately 0.5 and in that the apparatus comprises a supervisor (1) capable of controlling the common transmitting device according to two modes, the pulse mode in order thus to perform the ranging function, or the modulated continuous mode in order to thus perform the optical communication function. The shape factor is defined as: a ratio of peak power over mean power of the pulses; and for a digital signal composed of 1 and 0, this ratio of peak power over mean power=the duration of the '1' signals/duration of the '1' and '0' signals for optical communications.

This apparatus makes it possible to perform both functions of long-range ranging and of high bit-rate optical communication with a single apparatus. It is flexible to use with an instantaneous transition from one mode to the other, which allows the interleaving of the two modes as will be seen below.

According to one feature of the invention, the common transmitting device comprises a laser diode transmitter which comprises an electrical power supply, and the supervisor comprises means for controlling the electrical power supply of the laser diode transmitter.

This laser diode transmitter may be a single-ribbon laser diode or a stack of single-ribbon diodes capable of transmitting collectively.

Preferably, the transmitting device comprises a transmitter and an amplifier connected to the output of the transmitter.

According to one feature of the invention, the apparatus comprises a device for receiving signals transmitted by another optical communication device in free space, the receiving device of the rangefinder and this receiving device of the communication system being a common receiving device, and the apparatus comprises a control of the receiving device in ranging mode or in communication mode.

The supervisor comprises for example the control of the receiving device.

The transmitting device and receiving device are advantageously multiwavelength.

According to one feature of the invention, the multiwavelength transmitter comprises several transmitters, each being capable of transmitting at a different wavelength from the others and it comprises a single wideband amplifier connected to all these transmitters.

When the receiving device is multiwavelength, at least certain reception wavelengths are identical to certain transmission wavelengths.

A further subject of the invention is a ranging method of a target by means of an optical apparatus for ranging and communication as described above, which comprises a step of transmitting laser pulses to the target by means of the common transmitting device and a step of receiving the pulses backscattered by the target by means of the device for receiving the signal backscattered by the target. It is characterized in that it also comprises a step of transmitting by means of said common transmitting device a modulated continuous optical communication signal to a device for receiving this communication signal, the step of transmitting a communication signal being carried out outside the ranging transmitting and receiving steps.

According to one feature of the invention, it comprises several steps of transmitting a communication signal, and the step of transmitting laser pulses to the target, the step of receiving the pulses backscattered by the target and these steps of transmitting a communication signal are interleaved so that an optical communication signal is transmitted between two pulses and outside the step of receiving the pulses backscattered by the target.

According to another feature of the invention, since the transmitting device comprises a single amplifier, the time gap between two consecutive ranging pulses or between the end of a communication signal and the consecutive ranging pulse is greater than or equal to the time for pumping the amplifier to saturation.

When the transmitting device is multiwavelength and comprises only a single wideband amplifier, the time gap between two ranging pulses that are of different wavelength and consecutive is greater than or equal to the time for pumping the amplifier to saturation, the time gap between the end of a communication signal and the consecutive ranging pulse of the same wavelength is greater than or equal to the time for pumping the amplifier to saturation, and the communication signals of different wavelength are transmitted at the same time.

BRIEF DESCRIPTION OF THE DRAWINGS

Other features and advantages of the invention will become evident on reading the following detailed description, made as a nonlimiting example and with reference to the appended drawings in which.

From one figure to the next, the same elements are indicated by the same references.

DETAILED DESCRIPTION

The optical apparatus for ranging and communication can be monowavelength or multiwavelength.

Consideration is given first of all to a monowavelength apparatus.

Figure 1:
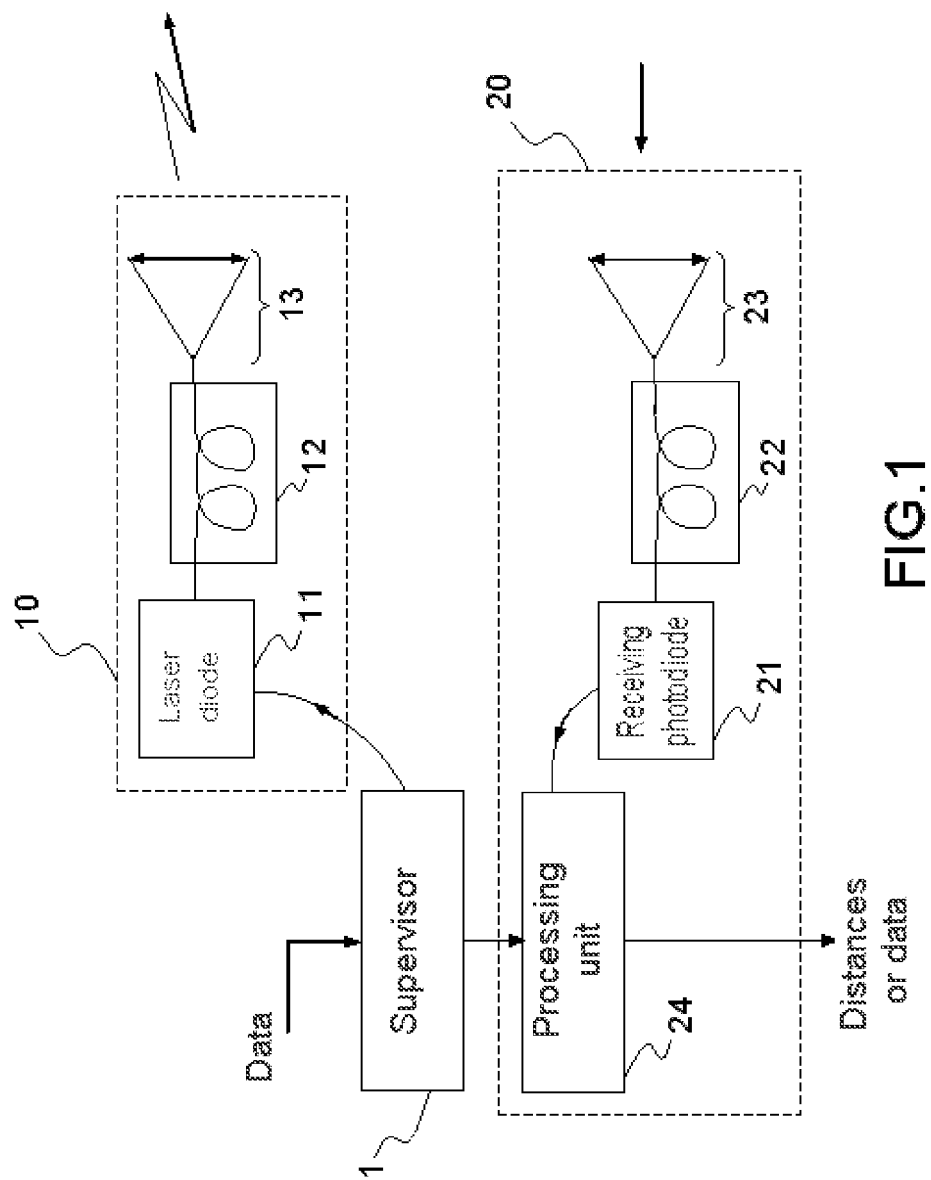
FIG. 1 represents schematically an example of a transmitting device and of a receiving device common to the rangefinder and to the communication system in a monowavelength configuration with an amplifier.

With reference to FIG. 1, a transmitting device 10 that is common to the rangefinder and to the communication system will be described. It comprises a laser source 11 that can be connected at the output to an amplifier 12 such as a fiber amplifier.

First, the case of a laser diode transmitter that is not connected at the output to an amplifier is envisaged.

The laser diode transmitter can be a single-ribbon laser diode or a stack of single-ribbon diodes transmitting collectively.

The pulse width is produced by the power supply of the laser diode or by that of the stack. Beyond a threshold, the transmission power is proportional to the power supply current.

In virtually continuous operation for communication, the maximum current and therefore the mean power are mainly limited by the thermal behavior of the component.

In ranging, with very short pulses, the peak power can be much greater and reach approximately 30 times the mean power used in virtually continuous operation. There is no thermal limitation as above, but a limitation by the resistance to the optical flux of the faces of the laser diode components.

The transmission time profile is very different for ranging and communication. It is via the electrical control of the laser diode that the two functions are differentiated depending on the desired time profile and the possible maximum current.

By taking as an example a simple laser diode, for the ranging function, pulses are obtained that have a peak power of several tens of watts and a repetition frequency of 20 to 30 kHz, by causing the current of the diode to vary from 0 to 10 A, at this same repetition frequency. For the communication function, a modulated optical signal is obtained at a frequency of several MHz and having a mean power of approximately 100 mW, by causing the current of the diode to vary from 0 to 100 mA at this same frequency.

A laser diode transmitter followed by an optical amplifier is now envisaged.

The optical amplifier 12 makes it possible to increase the ranging and communication performance. In ranging, this amplifier makes it possible to increase the energy of the pulse transmitted. In communication, it is the optical power that is mainly increased by the amplifier.

In ranging, the pumping of the amplification between two pulses must allow each pulse to have the required energy. The time gap between two pulses is adjusted so that the amplifier is pumped to saturation before a new pulse is transmitted by the laser diode. When the pulse is transmitted, it is amplified. This amplification depends on the energy of the pulse at the input of the amplifier. When the energy of the optical pulse of the laser diode is sufficient for all the energy stored in the amplifier to be transferred in the transmitted pulse, the transmitted pulse is then amplified to the maximum. The amplifier used is designed to supply high energies per pulse. The energy per pulse may be of the millijoule class. Such amplifiers are available from Manlight (Luskenn product class) or Keopsys (EOLA product class).

In communication, the laser diode transmits the pulse train of the communication signal while the amplifier is pumped; between two pulses of this pulse train, the amplifier does not have the time to reach the saturated mode. The mean power level of the laser diode is adjusted to optimize the efficiency of the device, which is to say so that all the pulses of the communication signal are amplified to the maximum all with the same gain.

For reasons of optimization, since the amplifier 12 is common to both functions, ranging and communication, circuits placed between the laser diode 11 and the amplifier 12 can be added, one for ranging and the other for communication. The circuit for ranging is typically a preamplifier to increase the energy of the pulse and thus promote the extraction of the energy of the amplifier; the circuit for communication may also be a preamplifier which has the function of adjusting the energy of each pulse in a predetermined range. The same preamplifier may be used for ranging and for communication provided that it is adapted according to its use as indicated above.

For a transmitter using an amplifier, the ranging and communication functions are possible sequentially; they may also be interleaved chronologically. As has been seen above, it is necessary in ranging that the amplifier 12 has its full energy capacity for each pulse. After the transmission of a ranging pulse, the amplifier needs sufficient pumping time to have the expected gain to amplify a communication pulse train. Similarly, after amplification of the communication pulse train, some time is necessary for the amplifier to recover its full capacities for the amplification of the pulses for ranging. This constraint is the same for a monowavelength transmitter or multiwavelength transmitter. Moreover, the communication transmission is not possible during the wait for the ranging echo.

The receiving part of a monowavelength apparatus will now be explained in detail. It comprises a receiving device for ranging and, in the case of a two-way communication system, it also comprises a receiving device for communication. These receiving devices may be independent of one another.

The receiving device for ranging comprises schematically a lens for collecting the light coming from the target, which focuses it on a detector. There may be a conveyance by fiber between the focusing point of the collecting lens and the detector. Devices for spectral filtering and for separating the transmitting and receiving channels may also be interposed. An optical amplification or a transposition of wavelength may also be in the path before the photodetector. The receiving photodetector may be a PIN or avalanche photodiode. The electrical bandwidth of the transimpedance circuit associated with this photodetector is adapted to the width of the pulses to be detected which is typically between 10 and 50 ns.

In the case of ranging, the extraction of a pulse is sought in the noise for the period corresponding to the extent of distance at which the target may be. According to the monopulse or multipulse operating mode (and therefore with post-integration), analog and digital processes known to those skilled in the art can be used to determine the distances. The limit of the processes is the rate of false alarms, namely how many false distances are fed back as a function of the number of tests.

Improving the performances consists in detecting the weakest possible signals by controlling all the noises associated with detection. The sources of noise are optical and electronic.

The receiving device for communication comprises schematically a lens for collecting the light that is transmitted directly by the remote transmitter of another communication system, focusing it on a detector. There may be a conveyance by fiber between the focusing point of the collecting lens and the detector. Devices for spectral filtering and for separating the transmitting and receiving channels may also be interposed. An optical amplification or a transposition of wavelength may also be in the path before the photodetector. The receiving photodetector for communication may be a PIN or avalanche photodiode. The detector may be a single element which means a single communication channel; this single element may be capable of detecting without distinction one or more wavelengths.

The electrical bandwidth of the transimpedance circuit associated with the photodetector is adapted to the bit rate that is higher than in ranging; it is greater than 100 MHz.

Communication performance depends on the bit rate that is acceptable by the transmitter, the receiver and the detectable energy.

In the case of communication, at each moment the processing must discern a 1 or a 0. The limit of the processes is the error rate.

Improving the performances consists in increasing the bit rate of transmitted information. The bit rate in monowavelength increases with the frequency of the pulse train. For communication to be again detected, the bandwidth must be increased to remain suitable.

The reception of communication is lit directly by the remote transmitter. Depending on the distance, the receiving conditions and the design of the receiver, the energy per bit and the frequency of communication are limited.

According to a particular embodiment of the invention, the receiving device for ranging is not independent from that of the receiving system for communication. Depending on the expected bit-rate performances of communication, the ranging detection and the communication detection share all or some of the necessary elements. The receiving device 20 of the apparatus may be common to ranging and to two-way communication. The transimpedance circuit associated with the photodetector may be the same. But it may be necessary to have detection with two modes having one bandwidth adapted to ranging and another bandwidth adapted to communication. The detection signal is then processed according to its use, ranging or communication.

The processings of the data originating from ranging and from communication are different notably because of the very different bit rates. Ranging is limited to a few pulses received per second. Communication may have bit rates of from kilobits to gigabits per second.

This common receiving device 20 can operate in ranging or in communication. This dual function makes it possible to range the target and transmits information to it.

For a diode transmitter with a single wavelength, it is risky to have a communication transmission when the rangefinder is waiting for ranging echoes. The diffusion of the light transmitted may disrupt the ranging reception. The two functions are possible sequentially.

FIG. 1 shows an example of an apparatus for ranging and monowavelength communication and ranging according to the invention. It comprises a supervisor 1 capable of receiving the communication or ranging data and of transmitting them to the common transmitting device 10 by sequencing the ranging transmitting and receiving steps and the communication transmitting and optionally receiving steps. The common transmitting device 10 comprises a laser diode 11 optionally connected at the output to an amplifier 12 itself connected to a optical device 13 for shaping the transmitted beam. The common receiving device 20 comprises a lens 23 for collecting the light transmitted by the target or by a remote communication transmitter; this lens 23 is optionally connected to an amplifier 22 itself connected to a photodetector 21 which transmits the detected signal to a processing unit 24 capable of supplying at the output distances of targets and communication data depending on whether the supervisor 1 controls this processing unit 24 in ranging or communication mode.

Advantageously, the apparatus according to the invention is multiwavelength, which makes it possible to increase the range of ranging and the number of codes for high bit-rate communications. It is described with respect to FIG. 2.

Consideration is first given to the transmitting device 10 common to the rangefinder and to the communication system.

In the case of a multiwavelength system, there are as many laser diodes 111, 112, 113, 114 as wavelengths to be transmitted. In the case of usage of an amplifier 12, it is common to all the wavelengths. Before the amplifier, the transmissions of the laser diodes are superposed in a single beam. This can be done by mirrors or by fiber coupling. The output is common to all the transmissions.

In ranging mode, each wavelength is transmitted on its own in order to have the strongest energy content. The advantage of the multiwavelength is the possibility of increasing the repetition frequency of the pulses with no problem of distance ambiguity. Specifically, this is the equivalent of having N rangefinders in parallel, each having a fairly large distance ambiguity relative to the range intended for ranging. In this pulse mode, the repetition frequency of the pulses is below the threshold frequency. Thus, no transmitter encounters the problem of ambiguity over the distance. From one wavelength to another, the repetition frequencies of the pulses may be different or identical. The moments of transmission of the ranging pulses of different wavelengths are preferably different because of the energy necessary for each pulse which otherwise would be shared; in FIG. 3a, N wavelengths (N=16 in the figure) are transmitted in succession and the repetition frequency is the same from one wavelength to another, in this instance 400 μs for a distance of ambiguity for targets from 60 km. The trains of N pulses are repeated many times in order to obtain the range budget by post-integration. The sequence of pulses is therefore: $\lambda 1, \ldots, \lambda N, \lambda 1, \ldots, \lambda N$, etc.

Figure 3A:
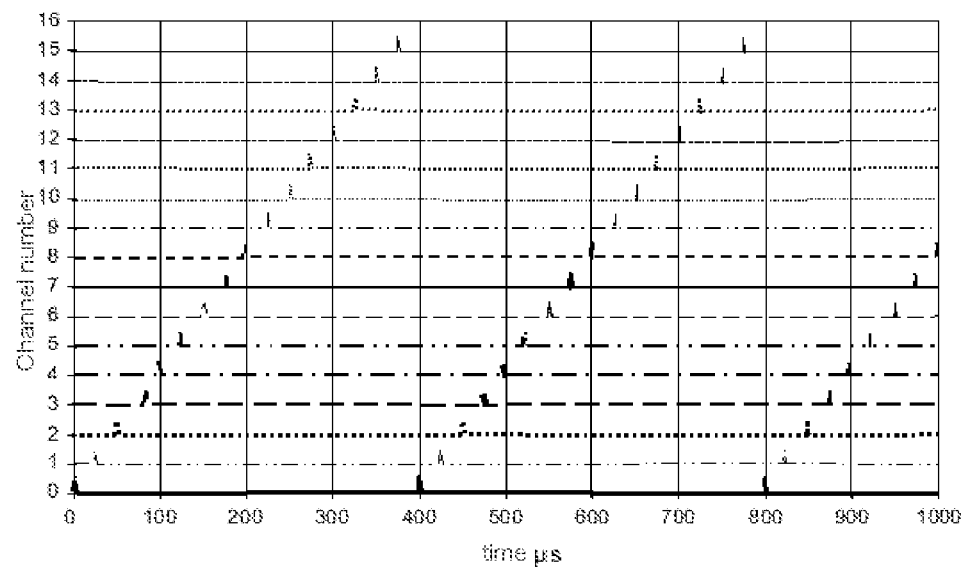

Since the amplifier is common to all the wavelengths, the pumping of the amplification between two pulses of different wavelength must allow each pulse to have the required energy. In the example of FIG. 3a, the gap between two pulses of different wavelength is 25 μs; pumping therefore lasts a maximum of 25 μs.

The order of the wavelengths has no effect on the ranging range.

The order of wavelengths may carry information and be used for other purposes, for identification for example.

Operation in communication depends on the capacity of the remote receiver for which this communication is intended. If this remote receiver has a single detector, only one communication channel can be set up. The remote receiver may be capable of receiving different wavelengths. The transmitting device must transmit at a wavelength that can be detected by the remote receiver. If the reception wavelength is unknown, the transmission may also activate in parallel several wavelengths transmitting identically and synchronously.

Communication may also be dedicated to a class of receivers characterized by its capacity to receive certain wavelengths. Discretion may be provided by a choice of wavelength beyond those used by most rangefinders.

Figure 3B:
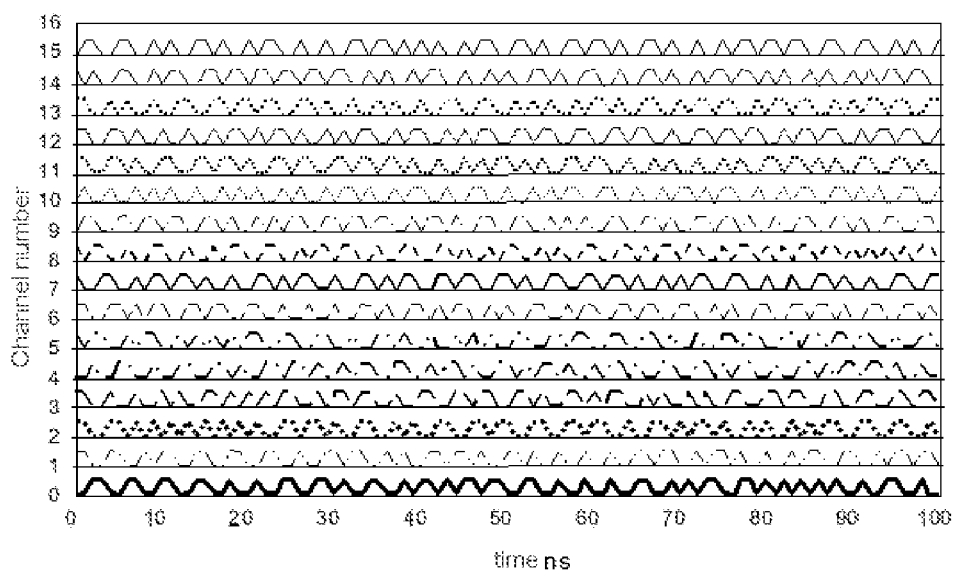

For communications, the N wavelengths are used simultaneously and carry independent codes (typically N=16). And one code is associated with each wavelength. This code consists, for example, in modulating the rate of the pulses which varies from one wavelength to another as can be seen in FIG. 3b. Each wavelength is an information channel independent of the others. The transmission will independently activate each wavelength that can be detected by the remote receiver. The amplification on transmission may be common to all the wavelengths. In this case, the communication signals which are usually different from one channel to another are simultaneously transmitted at all the wavelengths because there can be no ranging pulse transmission during the transmission of a communication signal. This makes it possible to transmit as many independent communication channels. The bit rate of communication is the product of the number of channels times the bit rate of each channel. Some of these channels may be exclusively dedicated to ranging.

FIG. 3b shows the operation of 16 channels of simultaneous communication at 1 gigahertz each, or a total bit rate of the order of 16 gigabits/second.

The common transmitting device can operate in ranging and in communication. This dual function makes it possible to rangefinder the target and to transmit information to it.

Figure 3C:
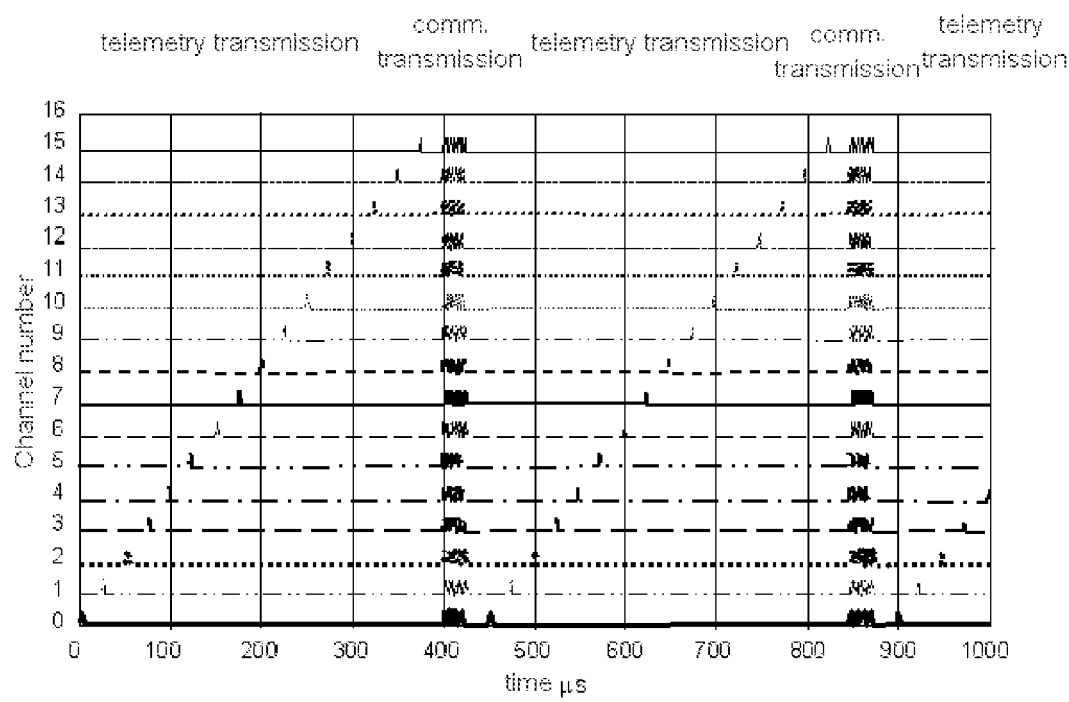
Figure 3D:
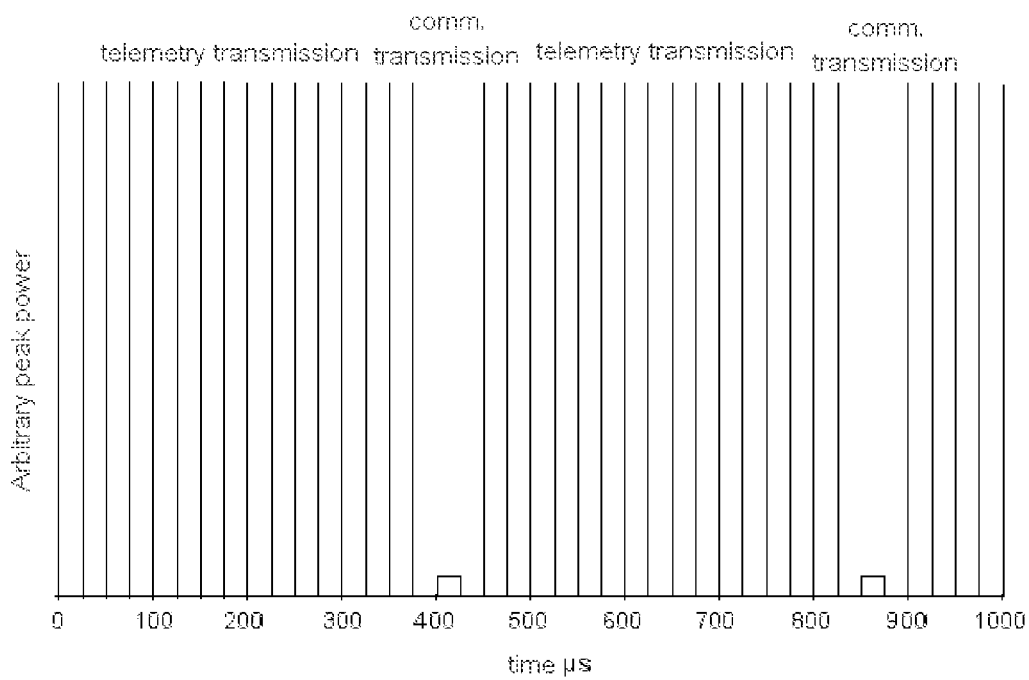

The multiwavelength apparatus can also operate with both modes interleaved. This dual mode is illustrated in FIG. 3c, for a configuration of the transmitting device with a single amplifier for all the wavelengths. The amplifier remains in saturated mode while transmitting a pulse for each wavelength with moments of transmission shifted from one wavelength to another, and then switches to continuous mode during the transmission for each wavelength of the modulated signal, these transmissions being simultaneous. Seen from the amplifier, the example of FIG. 3c is projected chronologically on the time axis in FIG. 3d: the amplifier has a pumping time of approximately 25 μs between two amplifications of ranging pulses of different wavelength, or between the amplification of one ranging pulse and that of the $1^{st}$ pulse of the communication pulse train. Because of these constraints stemming from the amplification, for each wavelength, communication transmission is not possible while awaiting ranging echoes of this same wavelength.

FIG. 3c represents a ranging and communication operating option using 16 wavelengths. The operating mode shown makes it necessary to neutralize the ranging receivers during the communication transmission. The system would have in ranging an efficacy equivalent to the use of the order of 14 to 15 wavelengths: specifically, it is possible that for one (or two) wavelength(s) the communication signal is transmitted during the reception of the corresponding ranging echo.

Depending on the performance requirements of ranging and of communication, many other ranging and communication sequencings as a function of the wavelengths can be optimized.

The reception portion of a multiwavelength apparatus is now considered.

The receiving device for ranging preferably comprises a device for amplifying each reflected pulse which makes it possible to amplify very weak signals by adding the minimum noise to them: the objective is to improve the detection signal-to-noise ratio. As for transmission, it is possible to choose a wideband amplification device which amplifies without distinction each pulse and/or narrowband amplification devices which amplify specifically each pulse.

An optical filter of the reflected pulses coming from the target is used to separate the various channels to be detected, that is to say in order to demultiplex them. The separation is spectral.

After this filtering, it is possible to amplify the pulses of each channel by means of a narrowband amplifier.

A detector can be used only in relation with a single channel. Since the distance of the target is not known, detection must be active so long as echoes are expected. Detection may be obtained by a detector capable of detecting the reflected pulses for several wavelengths and of distinguishing them according to their wavelength. There are no clear advantages in range performances over the monowavelength system. When long ranges are sought, there is an advantage in having as many detectors as transmission wavelengths.

A conventional accumulation device is used to carry out the post-integration of the detected pulses.

Operation in communication depends on the capacity of the receiver.

The receiving device for communication may have several detectors in different wavelengths. Each wavelength is an information channel independent of the others.

The multiwavelength receiving device can also operate with both modes interleaved as in the case of the monowavelength receiving device.

Figure 2:
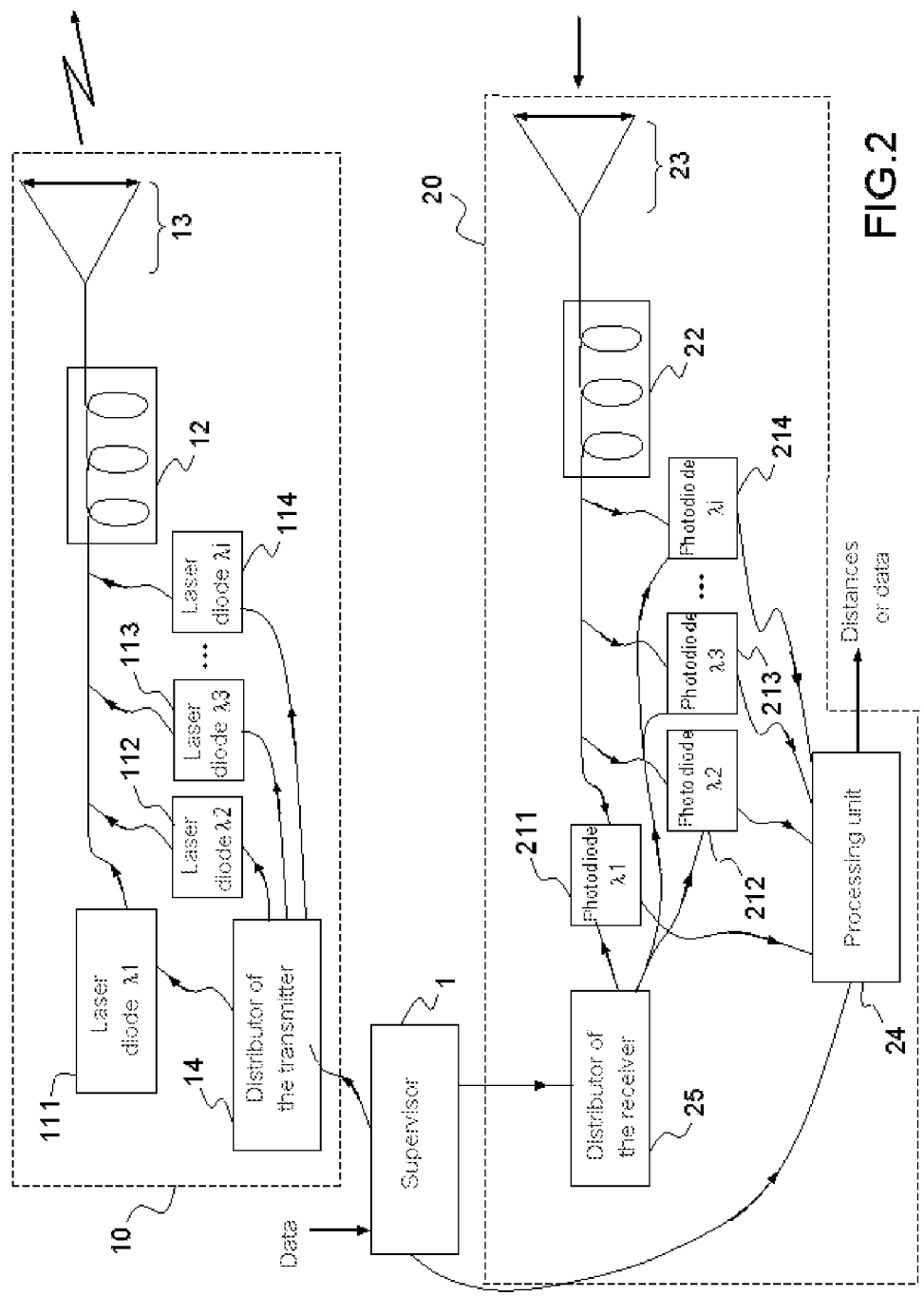
FIG. 2 represents schematically an example of a transmitting device and receiving device common to the rangefinder and to the communication system in a multiwavelength configuration with a single wideband amplifier, FIG. 3 illustrate schematically examples of moments of transmission of pulses in ranging mode (FIG. 3a), in communication mode (FIG. 3b) and in interleaved modes (FIGS. 3c and 3d) for a multiwavelength apparatus.

FIG. 2 shows an example of a multiwavelength apparatus for ranging and communication according to the invention. It comprises a supervisor 1 capable of receiving the communication data or the ranging data and of transmitting them to the common transmitting device 10 by sequencing the ranging transmitting and receiving steps. The transmitting device comprises a wavelength distributor 14 connected at the input to the supervisor 1 and at the output to laser diodes 111, 112, 113, 114 of different wavelength λ1, λ2, λ3, λi. The common transmitting device optionally also comprises these diodes, an amplifier 12 connected at the input to each of the diodes and at the output to an optical device 13 for shaping the transmitted beam. The common receiving device 20 comprises a lens 23 for collecting the light transmitted by the target or by a remote communication transmitter; this lens is optionally connected to an amplifier 22 itself connected to photodetectors 211, 212, 213, 214 respectively dedicated to a different wavelength λ1, λ2, λ3, etc. which respectively transmit their detected signal to a processing unit 24 capable of providing at the output distances of targets and communication data depending on whether the supervisor 1 controls this processing unit in ranging mode or communication mode. The photodetectors are connected via another distributor 25 to the supervisor 1.

The invention claimed is:

1. An optical apparatus for ranging and communication in free space comprising:
    a rangefinder comprising a transmitting device for transmitting an optical signal for ranging to a target and a receiving device for receiving the signals backscattered by the target,
    an optical communication system for optical communication in free space comprising the transmitting device for transmitting an optical signal for optical communication to a remote optical receiving device,
        wherein the transmitting device of the rangefinder and the transmitting device of the optical communication system is common to the rangefinder and to the optical communication system and capable of transmitting pulses of which a peak power is greater than 50 W and a shape factor is less than 0.01, the shape factor being defined as a ratio of the peak power over a mean power of the pulses, or a modulated continuous signal of which the peak power is less than 10 W and the shape factor equal to approximately 0.5, and
    a supervisor capable of controlling the common transmitting device according to two modes, a pulse mode to perform the ranging, or a modulated continuous mode to perform the optical communication.

2. The optical apparatus for ranging and communication as claimed in claim 1, wherein the common transmitting device comprises a laser diode transmitter including an electrical power supply, and the supervisor comprises means for controlling the electrical power supply of the laser diode transmitter.

3. The optical apparatus for ranging and communication as claimed in claim 1, wherein the laser diode transmitter is a single-ribbon laser diode or a stack of single-ribbon diodes capable of transmitting collectively.

4. The optical apparatus for ranging and communication as claimed in claim 1, wherein the transmitting device comprises a transmitter and an amplifier connected to an output of the transmitter.

5. The optical apparatus for ranging and communication as claimed in claim 1, wherein the receiving device is configured to receive signals transmitted by another optical communication device in free space, the receiving device being a common receiving device to the rangefinder and the optical communication system, and the apparatus comprises a control of the receiving device in the pulse mode for ranging or in the modulated continuous mode for optical communication.

6. The optical apparatus for ranging and communication as claimed in claim 5, wherein the supervisor comprises a control of the common receiving device.

7. The optical apparatus for ranging and communication as claimed in claim 1, wherein the common transmitting device and the common receiving device are multiwavelength.

8. The optical apparatus for ranging and communication as claimed in claim 7, wherein the multiwavelength transmitter comprises a plurality of transmitters, each being capable of transmitting at a different wavelength from the others and comprising a single wideband amplifier connected to all of the plurality of transmitters.

9. The optical apparatus for ranging and communication as claimed in claim 1, wherein the common receiving device is multiwavelength, at least one reception wavelength being identical to one transmission wavelength.

10. A ranging method of a target by means of an optical apparatus for ranging and communication as claimed in claim 1, comprising:
  a step of transmitting laser pulses to the target by the common transmitting device, and
  a step of receiving the laser pulses backscattered by the target by the receiving device for receiving the signal backscattered by the target, and
  a step of transmitting a modulated continuous optical signal to a device for receiving the modulated continuous optical signal by said common transmitting device, the step of transmitting the modulated continuous optical signal being carried out when the step of transmitting the laser pulses and the step of receiving the laser pusles is not being carried out.

11. The ranging method of a target as claimed in claim 10, wherein the transmitting device includes a single amplifier, a time gap between two consecutive ranging pulses or between an end of a communication signal and a consecutive ranging pulse is greater than or equal to a time for pumping the amplifier to saturation.

12. The ranging method of a target by means of an apparatus as claimed in claim 10, wherein the common transmitting device is multiwavelength and includes only a single time wideband amplifier, a time gap between two ranging pulses that are of different wavelength and consecutive is greater than or equal to a time for pumping the wideband amplifier to saturation, a time gap between an end of a communication signal and a consecutive ranging pulse of the same wavelength is greater than or equal to the time for pumping the wideband amplifier to saturation, and the method comprising transmitting communication signals of different wavelength at the same time.

13. The ranging method of a target as claimed in claim 1, further comprising a plurality of steps of transmitting a communication signal, and the step of transmitting laser pulses to the target, the step of receiving the laser pulses backscattered by the target and the plurality of steps of transmitting the communication signal are interleaved so that an optical communication signal is transmitted between two laser pulses and when the step of receiving the laser pulses is not being carried out.

* * * * *